United States Patent

Euchner et al.

[15] 3,668,327

[45] June 6, 1972

[54] CARRIER SUPPLY FOR MULTIPLEX COMMUNICATION SYSTEM

[72] Inventors: William H. Euchner; Eugene Y. Ho, both of San Carlos, Calif.

[73] Assignee: Farinon Electric, San Carlos, Calif.

[22] Filed: Nov. 20, 1969

[21] Appl. No.: 878,426

[52] U.S. Cl. ........................................ 179/15 FD, 331/76

[51] Int. Cl. ........................................ H04j 1/20

[58] Field of Search ..................179/15.55, 15, 15 R, 15 FD; 331/76, 77, 60, 38, 40

[56] References Cited

UNITED STATES PATENTS

| | | | |
|---|---|---|---|
| 3,202,930 | 8/1965 | Muraszko | 331/40 |
| 3,295,051 | 12/1966 | Broadhead | 331/76 |
| 3,311,812 | 3/1967 | Geiszler | 331/76 |
| 3,312,909 | 4/1967 | Bryant | 331/60 |
| 3,177,378 | 4/1965 | Pulfer | 331/76 |

FOREIGN PATENTS OR APPLICATIONS

| | | | |
|---|---|---|---|
| 666,012 | 2/1952 | Great Britain | 331/76 |

*Primary Examiner*—Kathleen H. Claffy

*Assistant Examiner*—Jon Bradford Leaheey

*Attorney*—Flehr, Hohbach, Test, Albritton & Herbert

[57] ABSTRACT

A carrier frequency supply including frequency dividers serves to receive a master frequency and form low frequency pulses having a high harmonic content. Filter means receive said pulses and filter out unwanted frequencies including the fundamental. The output of the filter is applied to a single harmonic amplifier which amplifies the harmonic frequencies and supplies the same to individual filters, each of which selects a carrier frequency from the harmonic frequencies.

4 Claims, 4 Drawing Figures

WILLIAM H. EUCHNER
EUGENE Y. HO
INVENTORS

BY: Flehr, Hohbach, Test, Albritton and Herbert
ATTORNEYS

WILLIAM H. EUCHNER
EUGENE Y. HO
INVENTORS

BY: Flehr, Hohbach, Test, Albritton and Herbert
ATTORNEYS

CARRIER SUPPLY FOR MULTIPLEX COMMUNICATION SYSTEM

BACKGROUND OF THE INVENTION

This invention relates generally to a carrier frequency supply for multiplex communication systems.

In multiplex communication systems a number of closely spaced carrier frequencies are required. Such frequencies have in the past been generated from a master oscillator, the output of which is divided down to provide relatively low frequency pulses having high harmonic content. The pulses are, in turn, applied to individual filters and harmonic amplifiers, one for each of the desired carrier frequencies. One of the problems with such a system is that the pulses applied to the filters and amplifiers have a relatively strong fundamental component which tends to overload the amplifier and filter network requiring high power amplifiers and sophisticated filters. Secondly, such systems are relatively expensive in that an amplifier is required for each of the carrier frequencies and in most systems redundancy of active components is required, thus necessitating two amplifiers for each carrier frequency.

OBJECTS AND SUMMARY OF THE INVENTION

It is a general object of the present invention to provide a carrier supply which is simple in construction and relatively inexpensive.

The present invention provides a carrier supply having means for generating pulses with high harmonic content at relatively low frequencies, a filter for passing a predetermined band of said frequencies, a harmonic amplifier adapted to receive said band of frequencies and to amplify the same and apply the frequencies to individual filters which select the predetermined carriers from the harmonic output of said harmonic amplifier.

DESCRIPTION OF THE PREFERRED EMBODIMENT

Figures 1, 2, 3:
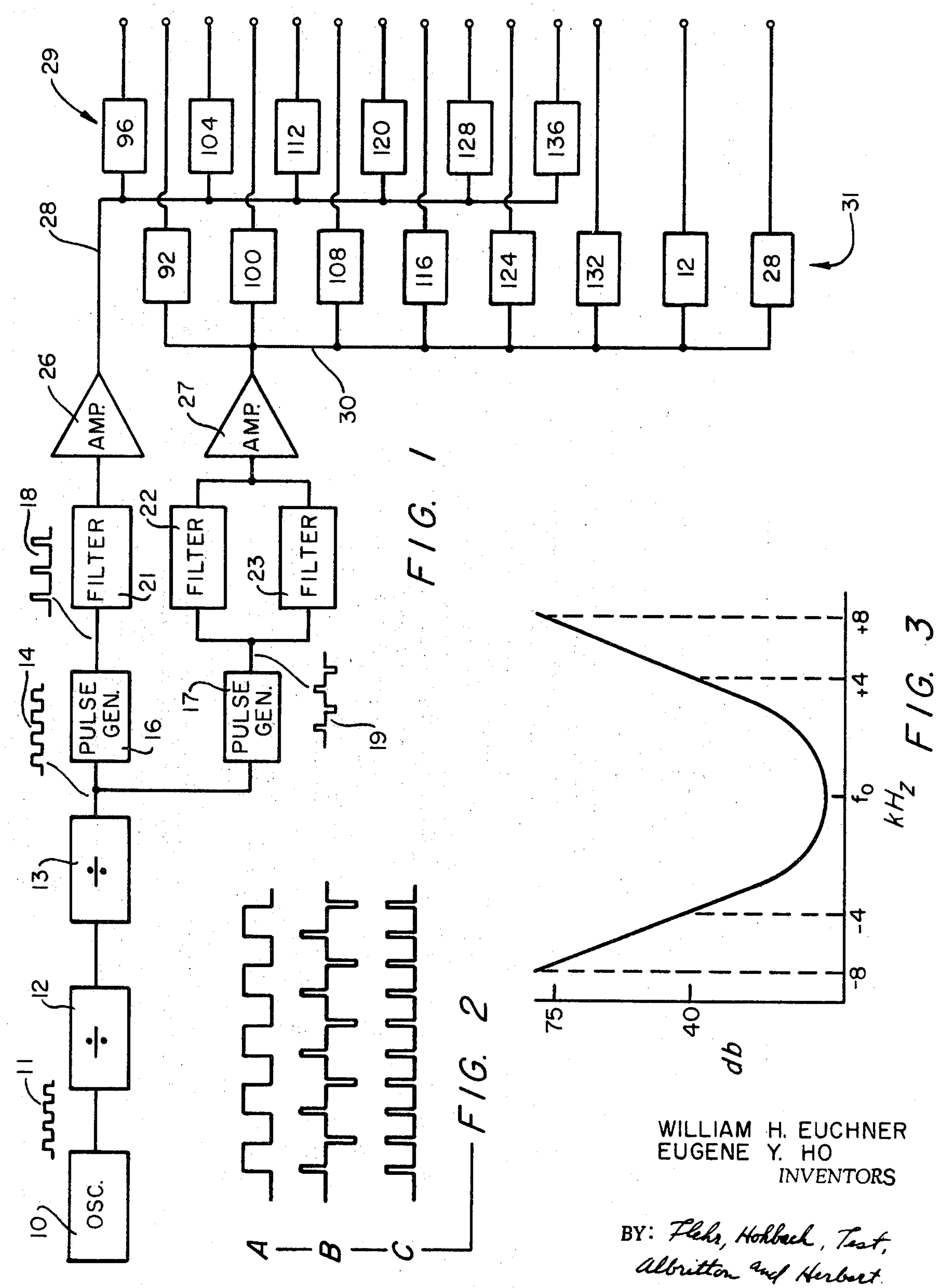
FIG. 1 is a block diagram of a carrier supply in accordance with the present invention.
FIG. 2 shows the pulse waveforms at the input and output of the pulse generators.
FIG. 3 shows the typical pass band of an output filter.

Referring to FIG. 1, there is shown a master oscillator 10 which may be a crystal controlled oscillator or an oscillator which has its frequencies controlled from a pilot tone. The oscillator 10 may have a frequency of 1,024 kHz. This frequency will be used throughout the description, it being understood, of course, that other frequencies can be employed. A typical output alternating current signal of the oscillator is shown at 11. This signal is applied to first and second dividers 12 and 13 each of which, in the particular instance under consideration, divides by 16 to provide an output pulse train 14 having a frequency of 4 kc. The pulse train 14 is applied to even pulse and odd pulse generators 16 and 17. The output of the even pulse generator is shown at 18 and comprises pulses having a pulse repetition rate of 8 kHz. These pulses are of relatively high constant amplitude and width duration whereby to have a very high constant harmonic content. The odd pulse generator 17 provides output pulses 19 having a fundamental frequency of 4 kHz which are also of high constant amplitude and narrow width. Pulse generators suitable for accepting pulses 14 and generating pulses of the type shown at 18 and 19 will be presently described in connection with FIG. 4.

In accordance with the present invention, the relatively high power pulses are applied to filters 21, 22 and 23, each of which serves to filter out unwanted frequencies including the fundamental pulse frequencies 4 kHz and 8 kHz. In one particular example, the filter 21 passed the frequencies 92–136 kHz; the filter 22 passed the frequency band 92–136 kHz; and the filter 23 passed the frequency band 12–28 kHz. In accordance with the present invention, the output of the filter 21 is applied to a harmonic amplifier 26 while the output of the filters 22 and 23 is combined and applied to another harmonic amplifier 27. Since the output of the filters 21, 22 and 23 have only the desired harmonic frequencies, a single amplifier can provide enough output power for driving a plurality of filters. The amplified harmonic signals are applied directly to a plurality of associated filters which select the desired frequency. The output of the amplifier 26 is applied to buss 28 which is connected to a plurality of filters 29 labelled 96, 104, 112, 120, 128 and 136 corresponding to the pass band frequency in kHz. Likewise, the output of the amplifier 27 is applied to a buss 30 which has its output applied to a plurality of filters 31 marked 92, 100, 108, 116, 124, 132, 12 and 28 which pass the corresponding frequencies in kHz. It is understood that the above frequencies are for the system under discussion and that other output frequencies can be provided by appropriately selecting pulse generators, amplifiers and filters.

Thus, there is provided a carrier generating system which employs a minimum of components and in which there is only required a pair of harmonic amplifiers for providing a large number of carrier frequencies, in this example 14. This is in contrast to the prior art type systems wherein an amplifier is associated with each of the output filters.

Referring to FIG. 2, the input to the pulse generators is shown at A, while the output from the odd pulse generator is shown at B. In essence, the pulse generator provides a sharp spike or high amplitude pulse at each of the changes of the square-wave in FIG. 2. The output of the even pulse generator is shown at C which, in essence, provides a high amplitude pulse at double the fundamental frequency by applying a positive going pulse at each of the changes in the basic pulse train A.

Referring to FIG. 3, a typical filter characteristic for the filters 29 and 31 is shown. It is to be observed that the filter is down 40 db at plus and minus 4 kHz from the fundamental frequency $f_o$ and 75 db down at −8 kHz and +8 kHz. The odd and even harmonics are 8 kHz apart and, as a result, relatively pure carrier frequencies are available at the output.

Figure 4:
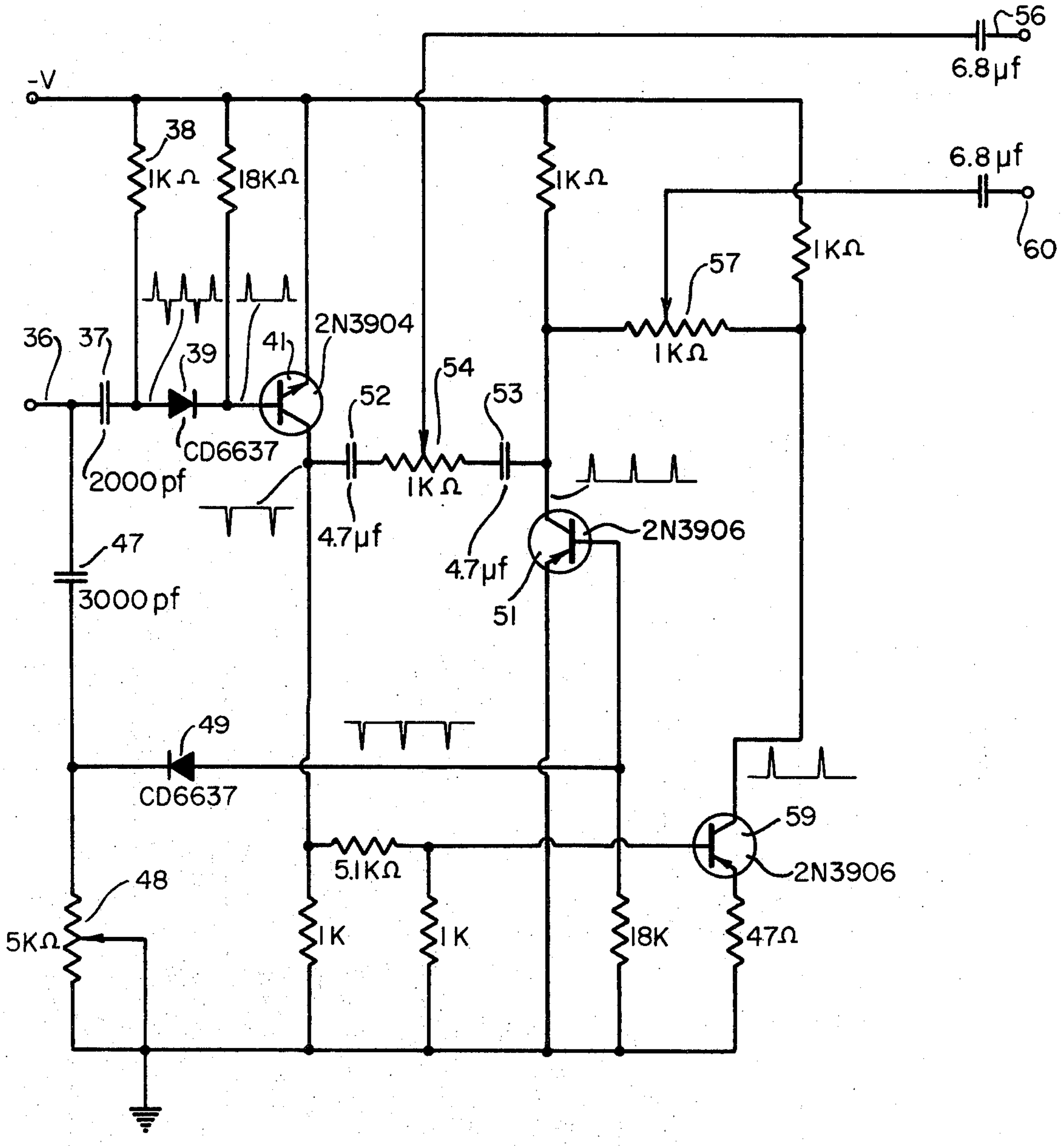
FIG. 4 is a detailed diagram of the pulse generators employed in the system of FIG. 1.

Referring to FIG. 4, the odd and even pulse generator circuit is shown in detail. The output 4 kHz from the divider 13 is applied to the terminal 36 where it branches into two differentiating networks for the odd and even circuitry. The first branch network includes a fixed capacitor 37 and fixed resistor 38 which converts the square-wave to positive and negative spikes as shown. The diode 39 allows the positive spikes to pass to the transistor amplifier 41. The output on the collector of the transistor 41 is an inversion of its input and comprises negative going spikes at a 4 kHz interval.

The second branch is a variable differentiating network including the capacitor 47 and potentiometer 48 which controls the pulse width of the positive and negative spikes resulting from the differentiation of the square-wave input. This adjustment affects the relative outputs of the carrier band pass filters 29 and 31 providing the individual frequencies. Diode 49 allows the negative spikes to pass to transistor amplifier 51. The output of the transistor amplifier 51 is an inversion of its input and and comprises positive spikes at a 4 kHz interval. The odd output applied to the filters 22 and 23 is derived by cancelling the even harmonics. This is achieved by combining the negative spike from the output of transistor 41 with the positive spikes from the output of the transistor 51 across a balance control including capacitors 52 and 53 and the potentiometer 54. The potentiometer 54 provides a symmetry adjustment for minimizing even harmonic content on the signal. The odd harmonic output pulses are then available at the output terminal 56.

The even harmonic output is derived across the potentiometer 57 by combining the positive spikes from the transistor 51 with the out of phase positive spikes obtained by inverting the output of the transistor 41 via the transistor 59. The resulting signal contains positive spikes of even harmonic content at an 8 kHz rate. The potentiometer 57 provides a balance adjustment between adjacent spikes for minimizing odd harmonic content in the signal. The even harmonic output is available at the terminal 60.

Thus, it is seen that there has been provided a relatively simple and economical carrier supply for multiplex communication systems.

I claim:

1. A carrier frequency supply including means providing pulses having high even harmonic content and pulses having high odd harmonic content at a relatively low pulse repetition rate, filter means for filtering out the fundamental pulse frequencies corresponding to the repetition rate and serving to pass frequency bands of high even and high odd harmonic content respectively, an amplifier means for receiving the output frequency bands of said filter means and amplifying the same, and a plurality of carrier filters connected to receive the output of the amplifiers and each pass a selected harmonic frequency in said band to provide a plurality of carrier frequencies.

2. A carrier frequency supply as in Claim 1 wherein said means for providing pulses having high even harmonic content and pulses having high odd harmonic content includes means for minimizing the odd and even harmonic content respectively.

3. A carrier frequency supply as in claim 1 wherein said means for providing pulses having high even harmonic content and high odd harmonic content includes means for generating pulses at a reference frequency, first and second differentiating networks connected to receive said pulses and convert the same into positive and negative narrow pulses, first diode means for passing the positive pulses from said first differentiating network, first amplifying means for receiving and amplifying said pulses, second diode means for passing the negative pulses from said second differentiating network, second amplifying means for receiving and amplifying said pulses, first combining means for combining the output of said first and second amplifying means and providing an output pulse train having high odd harmonic content, third amplifying means for receiving the output of said second amplifying means, and second combining means for receiving the output of said first and third amplifying means and providing output pulses having high even harmonic content.

4. A carrier frequency supply as in claim 3 wherein said first combining means includes means for minimizing the even harmonic content of its output pulses and said second combining means includes means for minimizing the odd harmonic content of its output pulses.

* * * * *